Patented Oct. 29, 1946

2,410,124

UNITED STATES PATENT OFFICE 2,410,124

PRODUCTION OF PLASTICIZED PROLAMINE AND DERIVATIVE COMPOSITIONS

Willard L. Morgan, Columbus, Ohio, assignor of one-half to A. E. Staley Manufacturing Company, Decatur, Ill., a corporation of Delaware, and one-half to American-Maize Products Company, New York, N. Y., a corporation of Maine No Drawing. Application November 24, 1944, Serial No. 565,065

18 Claims. (Cl. 106—153)

This invention relates to plasticizers for prolamines, and to the resultant plasticized prolamine and "prolamine-base" compositions.

It is an object of this invention to provide novel plasticized "prolamine-base" compositions.

It is another object of this invention to provide novel "prolamine-base" compositions with plasticizers exhibiting highly desirable compatibility and solvency for the prolamines, thus permitting the preparation directly of plastic masses, coatings and films with the prolamines.

It is a still further object of this invention to provide novel "prolamine-base" compositions having plasticizers for prolamines of improved compatibility characteristics which compositions may be applied in solvents as adhesives or coatings, or thus applied in forming films or plastics.

Other and ancillary objects of this invention will be apparent from the detailed description and examples thereof hereinbelow set forth.

The prolamines have long been established as exhibiting certain properties unique among the proteins, and as such have been classified by workers dealing with proteins as a separate group thereof. By definition, the prolamines are those proteins characterized by solubility in aqueous ethyl alcohol. They are found only in cereal grains and, contrasted to other proteins, are high in the amino acid proline and amide nitrogen content, and are deficient in free amino groups and in lysine. They are very nearly or entirely insoluble in water and weak aqueous acid solutions, but are freely soluble in dilute alkali solutions in water.

Although in the following description and examples I shall refer to the particular prolamine zein which is derived from corn, it is to be understood that this invention is equally applicable to the other prolamines, and "prolamine-base" proteins, that is, to hordein, derived from barley; to kafirin, derived from sorghum; to gliadin, which is derived from wheat; to secalin, derived from rye, and to the cereal glutens generally.

The diverse and potentially large-scale utilization of plasticized prolamine compositions has long been attractive, and the discovery of satisfactory plasticizers for the prolamines in general, and, in particular, for the prolamine zein which is of industrial importance, has been the object of extensive investigation. Various plasticizers for this purpose have been proposed, but most of such prior art materials have exhibited low plasticizing activity or undesirable characteristics such as incomplete compatibility, high melting point, strong odors, water solubility or rapid loss by volatilization from the prolamine, thereby, and in other ways, resulting in compositions which are unsatisfactory commercially in one respect or another.

In this invention there is set forth the surprising discovery that alkyl branched-chain saturated and unsaturated organic fatty acids in which the total number of carbon atoms in a molecule lies in the range 4 to 18, inclusive, function as remarkably effective plasticizers for prolamines. Thus, for example, 2-methyl propenoic acid, 2-ethyl butanoic acid (2-ethyl butyric acid), 2-ethyl hexanoic acid (2-ethyl caproic acid), 2-ethyl octanoic acid (2-ethyl caprylic acid), 2-ethyl decanoic acid (2-ethyl capric acid), 2-trimethyl acetic acid (pivalic acid), 5-methyl hexanoic acid (5-methyl caproic acid), 2-propyl butanoic acid (2-propyl butyric acid), 2-octyl decanoic acid (2-octyl capric acid), are effective plasticizers for the prolamines. Furthermore, mixtures of these acids as, for example, 2-ethyl butanoic and 5-methyl hexanoic acids, combined in any proportions whatever with each other constitute effective prolamine plasticizers. The branched-chain fatty acids may also be employed as plasticizers in prolamine plastics in combination with other known plasticizers such as dibutyl tartrate or para toluene sulfonamide. The amount of plasticizer which may effectively be incorporated with the prolamine to result in a useful, plasticized composition occupies an extremely broad range of percentages based on total product composition, and the amount employed will depend upon the properties desired in the plastic to be produced. For example, if 5 percent (by weight of the resultant composition) of branched-chain fatty acid plasticizer be incorporated with, say, the prolamine zein, the plasticized product is hard and tough in character. When on the other hand, increasingly greater percentages of plasticizer are incorporated with the zein, the resultant compositions exhibit increased flexibility and softness such that at a content of 50 percent by weight in the product, the plastics often resemble many rubber articles.

When 80 to 95 percent by weight of the resultant composition is plasticizer, the products are permanently soft and tacky. Fundamental product characteristics may be regarded, then, as a function of plasticizer content, and it therefore follows that the amount of plasticizer to be incorporated with a prolamine will be determined by the use to which the product is to be put. Further in this regard, it has been discovered that product hardness is defined to a certain extent by the nature of the branched-chain fatty acid plasticizer itself. Thus, in general, the greater the length of the branched-chain, or the more complex the branched nature of the fatty acid, the harder the plasticized prolamine composition for any given amount of plasticizer. The presence of hydroxyl or of amino groups, or of unsaturation in the acid structure, is found to improve the softening or plasticizing action and compatibility with the prolamine. It is evident, then, that a wide range of plasticized compositions are obtainable by means of this discovery, and, further, that product characteristics may be modified at will by judicious choice of plasticizer and the quantity thereof incorporated with the prolamine.

It has previously been proposed to plasticize various proteins, including the prolamine zein, with saturated and unsaturated straight-chain fatty acids such as, for example, butyric acid, caprylic acid, caproic acid, capric acid, stearic acid, linoleic acid, oleic acid, and the like. However these present various disadvantages, thus: the problem of offensive odor practically precludes use of the shorter-chain acids; longer-chain acids of this type are very poorly compatible and exhibit negligible plasticizing activity. On the other hand, the branched-chain fatty acids of the present invention are not only effective prolamine plasticizers, but are characterized by practically unnoticeable, bland, mild odors. Furthermore, these branched-chain compounds exhibit relatively high boiling points, generally increasing with molecular weight, and are consequently subject to very slow evaporation from the compositions in which they are incorporated. For example, of the suitable plasticizers for the present invention, at normal pressures (760 mm. of mercury), trimethyl acetic acid boils at a temperature of about 163.8° C. 2-ethyl butyric acid (2-ethyl butanoic acid) in the range 195 to 197° C. 2-methyl propanoic acid (isobutyric acid) at a temperature of 154.4° C., 2-ethyl caproic acid (2-ethyl hexanoic acid) in the range 223 to 225° C., 2-methyl propenoic acid (methacrylic acid) at a temperature of 163° C., and 2-octyl capric acid (2-octyl decanoic acid) boils at a temperature of 270 to 275° C. under a pressure of 100 mm. of mercury. Branched-chain fatty acids having a total number of carbon atoms outside of the preferred range of 4 to 18 inclusive hereinabove set forth are not particularly well suited for plasticizing prolamines since acids of this type of greater than 18 carbon atoms exhibit little if any plasticizing activity. Further, branched-chain fatty acid compounds within this preferred range are substantially water-insoluble save for the lowest members thereof, which are soluble to a certain extent.

The plasticized compositions resulting from practice of this invention have been found of versatile utilities not only as plastic rods, sheets and molded articles, but also as coatings of various types. Thus, for example, these compositions may be made into solutions and applied as a sizing; utilized for impregnating and coating, particularly for grease and water-proofing purposes; and applied to the production of flexible films, lacquers, wall and floor paints, deck enamels, grease and moisture-proof lacquers for application to metallic surfaces, protective varnishes for printed and other paper surfaces, adhesives, laminated products of various types, plastic compositions, linoleum, oilcloth, and the like. These uses are, of course, cited as being illustrative only of the diverse applications of the novel compositions, and as in no way imposing limitations thereon, there being many related and other uses which will at once be apparent to those skilled in such arts.

In practicing this invention, the optimum quantities of plasticizer to be incorporated to secure the qualities desired for the use to which the resultant composition is to be put, will at once be apparent to those skilled in the respective arts from the further description and examples hereinafter set forth.

As a general procedure, the prolamine and plasticizer may be thoroughly mixed in the desired proportions at room temperature. The mixture may then be heated and maintained at a more or less elevated temperature until homogeneity has been attained, as evidenced by disappearance of the prolamine and plasticizer as individual entities with consequent formation of a single, homogeneous mass. This may be carried out in internal mixing machines or upon plastic milling rolls. Pigments, dyes, fillers, resins and the like may be added to the masses while in these machines. Upon cooling to room temperature, the plasticized composition will be more or less hard and pliable, depending upon the amount and nature of plasticizer incorporated therein, as hereinabove set forth. In the incorporation of other materials with plasticized prolamine compositions for the production of lacquers, sizing, coating or impregnating materials, printing inks, adhesives, or the like, it is frequently advantageous to mix all of the individual components thereof including solvents at the outset of operations, rather than to plasticize the prolamine preliminarily and thereafter to incorporate the plasticized product with the other compounding materials, although such may be done. However the sequence of such operations is not at all critical, and in general will be governed by the character of the technical operations involved, by the arrangement thereof which results in optimum process economies, and by the established production methods conventionally practiced in each particular industry.

As hereinabove set forth, the plasticizers of the present invention may be employed, alone or in conjunction with other known plasticizers, for various plastic modified prolamine compositions, such as, for example, aldehyde reacted prolamine plastics. It is well known to react prolamines with aldehydes, particularly formaldehyde, to form solutions, coatings, and thermosetting plastic compositions of improved water resistance and widely varying properties depending upon the nature and amount of ingredients incorporated therein, and upon the temperature and duration of aldehyde reaction. If desired, the plasticized prolamine compositions of this invention may be aldehyde-cured according to conventional techniques, to result in useful plastics and coating compositions which, after curing, are no longer thermoplastic, but are thermosetting in nature, and by reason of the plasticizers set forth in the present invention are flexible and tough. It is apparent that while aldehyde curing operations with plastics and coatings are preferably carried out upon conclusion of plasticization of the prolamine material, it is possible to add the plasticizers to solutions of prolamines which have been first reacted with the aldehydes.

The prolamines constitute a large portion of the protein found in the starchy or endosperm parts of the cereal grains and they are commonly isolated from such starchy portions after the grains have been de-germinated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce more concentrated or purified alcohol-soluble prolamines as is well known in the art for producing zein and gliadin. These various prolamines may be used to manufacture prolamine compositions and plastic products and be cured with formaldehyde. Certain modifications of the prolamines have become available, such as for instance zein acetate, or zein modified by heat and water-vapor or water treatment; these may be plasticized to compositions of the present invention and when compositions or plastics are formed of prolamines with aldehydes, the resultant compositions may likewise be plasticized with the branched-chain fatty acids to produce compositions of this invention.

Prolamine plastic compositions may also be formed from the crude protein concentrates, such as the cereal glutens, derived directly from the de-germinated cereals when these contain a considerable proportion of a prolamine. Thus, as a suitable corn protein for forming plastics we may use the corn gluten resulting from the commercial separation of cornstarch in the wet-milling process, which gluten may contain from 40 to 65% by weight of corn proteins primarily of prolamine nature, a large part being the alcohol-soluble prolamine zein. The non-protein remainder of the gluten consists primarily of starch with small quantities of cellulosic bodies and fatty substances. Partially purified corn glutens such as those produced in Shildneck Patent U. S. No. 2,274,004 by further removal of starch with acids or as shown in Schopmeyer Patent, U. S. No. 2,310,104, wherein fatty materials are removed and which contain 60 to 100% by weight of protein content, may also be used in making corn protein compositions and plastics and aldehyde cured products, which may be modified with plasticizers to form compositions of the present invention. It will be understood that as the word "prolamine-base" protein is used in the description here given and in the appended claims, I include by such term not alone the purified prolamines isolated from the various cereal grains but also include protein products and mixtures of cereal proteins produced from the endosperm which contain a considerable proportion of prolamine, and also include by such term modified or chemically altered prolamines and aldehyde cured prolamine products.

The following examples will serve to illustrate, to a more or less limited extent, the scope of the present invention, and the presently more important practical applications thereof. It is to be explicitly understood that the present invention is in no way limited to the applications thereof set forth in these examples, nor to the particular ingredients or to the amounts therein specified, since equivalent ingredients in varying percentages may be used for these and other applications, as will be readily apparent to those skilled in such arts. Thus, for instance, in those examples in which individual solvents or solvent mixtures are employed, it will be understood that any solvent or solvent mixture exhibiting solvency for the prolamine and for the plasticizer will function adequately as a mutual solvent for the unplasticized and for the plasticized prolamine materials. Thus, for example, methyl Cellosolve, aqueous ethyl alcohol, aqueous isopropyl alcohol, aqueous diacetone alcohol, carbitol, methyl carbitol, are individually solvents both for zein and for the plasticizers used in this invention, and therefore function, either separately or in combination, as solvents for both unplasticized and plasticized prolamine materials. Other solvents such as toluene may be added in certain amounts to such solvent mixtures for certain desirable purposes functioning as auxiliary solvents of which many are known in the prolamine solvent field.

*Example 1*

By weight 70 parts of zein and 30 parts of 2-ethyl butanoic acid were placed in a jacketed internal plastic mixer of the dough type used in the rubber industry and thoroughly mixed at room temperature. The agitated mix was then heated to a temperature not exceeding 130° C., and maintained at a temperature in the general range of 100° to 130° C., for a period of about 60 minutes, at which time plasticization of the zein had been substantially completed as evidenced by disappearance of the zein and of 2-ethyl butanoic acid as separate entities, thereby resulting in a uniform homogeneous plastic solution. Upon cooling to room temperature this product was found to be clear, transparent, substantially colorless and uniform when viewed in thin sections. It was a thermoplastic composition, which could when again heated be extruded and molded into formed plastic articles, such as plastic tubes, doorknobs, toys, and the like. These plastic articles were essentially odorless and tough, and could be deformed and fractured only with difficulty.

*Example 2*

By weight 10 parts of 2-ethyl hexanoic acid, 5 parts of 2-ethyl decanoic acid, 15 parts of oleic acid, 5 parts of 2-methyl propanoic acid, and 10 parts of 2-trimethyl acetic acid were thoroughly mixed at room temperature. The resultant mixture was heated in a jacketed mixer to a temperature in the general range of 120° to 135° C., while 60 parts of zein were gradually mixed in during the course of an hour. The plastic dough was further worked for a period of about 20 minutes, at which time a clear, homogeneous plastic solid solution had resulted and plasticization of the zein was substantially complete. Upon cooling a small portion to room temperature the product was found to be a clear, homogeneous, substantially transparent and colorless thermoplastic composition, relatively tough and pliable at ordinary temperatures, and thus directly usable as a plastic. When cooled to below 70° C., there was incorporated in the main plastic batch by weight 30 parts of rosin and thereafter 1 part of trioxymethylene. The batch was then sheeted at about 70° to 80° C. on rubber rolls and pieces were then pressed in a heated press at 250 lbs. per square inch at 135° C., for one half hour. This gave aldehyde-cured plastic articles generally similar to those produced by Example 1 but distinguished therefrom by not being thermoplastic and by having greater water-resistance.

*Example 3*

A rubber-like plastic suitable for use as a shoe sole was made by mixing in an internal mixer the following ingredients:

| | Parts by weight |
|---|---|
| Zein | 37 |
| 2-ethyl hexanoic acid | 35 |
| Dibutyl butanoic acid | 9½ |
| Trioxymethylene | 1½ |
| Clay | 12 |
| Carbon black | 5 |

The zein and plasticizer were first entered into the internal mixer and after working for approximately one hour the pigments were added in small portions at a time more readily to provide a homogeneous mixture. The working of the mass readily provides heat which was removed by cooling to below 80° C., by a water-cooled jacket upon the internal mixer. Thereafter the trioxymethylene was quickly introduced and milled in during a short period of time of five minutes or less, at below about 80° C. The plastic mass was then removed from the internal mixer and sheeted out at below about 80° C. upon a rubber milling roll and portions of the thermoplastic uncured sheet were then placed within an ordinary shoe sole mold such as is used in the rubber trade. Curing was then carried out by heating such mold to 130° C., for one-half hour under a hydraulic pressure of 100 to 500 lbs. per square inch. Such pressures have been found suitable in the manufacture of plastics from prolamines. The product was tough and flexible and in general had qualities similar to ordinary rubber shoe soles.

*Example 4*

As an example wherein there is employed a crude mixture of cereal proteins containing prolamines, hard prolamine plastic articles such as door knobs of a black color were made by molding under similar conditions to those used in Example 3 masses of the following plastic mixture:

| | Parts by weight |
|---|---|
| Corn gluten, 60% protein content | 40 |
| Nevillac 10° (coumarone indenephenol resin, Neville Co., Pittsburgh, Pa.) | 35 |
| 2-ethyl decanoic acid | 10 |
| Asbestine | 8 |
| Channel black | 5 |
| Trioxymethylene | 2 |

In making the plastic mixture the plasticizer, resin and gluten were first mixed in a plastic masticating machine. The pigments were then incorporated by adding small portions at a time and the mass worked until it was thoroughly uniform. While still in the plastic machine, the mass was then cooled to 75° C., and the trioxymethylene quickly introduced. After further working for approximately five minutes to distribute the formaldehyde-curing compound uniformly throughout the mass, the mass was removed from the mixer and sheeted at below 75° to 80° C., in milling rolls, prior to actual molding operations at temperatures above 120° C.

*Example 5*

By weight 40 parts of zein and 60 parts of 2-ethyl hexanoic acid were dissolved at room temperature in a solvent mixture comprised of about 30 parts by weight of methyl Cellosolve and about 70 parts by weight of 95% (by weight) ethyl alcohol. The resulting solution was found to be directly applicable for many uses; for example, for sizing, coating, impregnating and waterproofing textiles, paper, wood, tinplate and the like. As a coating material, the solution was eminently suited for application to varnished, lacquered, and the like surfaces. Further, it was found to form removable strong, tough, pliable, transparent films when cast upon an oiled or waxed glass surface. In addition to these properties, the films were oil-resistant, hard and non-tacky in nature, and furnished an excellent surface for printing purposes. When applied to paper there resulted excellent grease- and moisture-proof coatings, giving flexible wrappings suitable for food-stuff packaging. Coated upon tinplate the coating was found to withstand canforming operations and repeated flexing without cracking. The coating was excellent in grease-resistance.

*Example 6*

By weight 20 parts of cereal gluten derived from corn, 40 parts of 2-propyl butanoic acid, 10 parts of tetraethylene glycol and 25 parts of carbon black were thoroughly ground together on a roller mill. The resultant product was found to be suited for use as an ink for printing cotton bags.

*Example 7*

By weight 47 parts of zein, 53 parts of 2-ethyl decanoic acid, 100 parts of clay, and about 50 parts of 80% (by volume) aqueous ethyl alcohol and 15 parts of ethyl lactate were thoroughly mixed together and ground in a ball mill for a period of about 24 hours. The resultant composition was knife-coated onto a sized woven sheeting base, which was then force-dried for about 1 hour at a temperature of about 150° F. The resultant "oilcloth" type of product exhibited excellent wearing qualities, resistance to flexing and to the action of water, acids, and greases.

*Example 8*

By weight 95 parts of zein, 5 parts of 2-octyl decanoic acid, 0.1 part of oil-soluble dyestuff Yellow OB, and about 240 parts of a solvent mixture comprised of 80 parts by weight of diacetone alcohol and 160 parts by weight of 95% (by volume) ethyl alcohol, were mixed together overnight in a ball mill. The product was a shellac substitute eminently suited for coating wooden surfaces.

*Example 9*

By weight 75 parts of gliadin and 25 parts of 2-ethyl hexanoic acid were thoroughly mixed at room temperature. The resultant mixture was heated to a temperature of about 127° C., and maintained at a temperature in the general range 120° C. to 135° C., for a period of about 35 minutes, at which time a clear, homogeneous solution indicating complete plasticization of the gliadin, had resulted. Upon cooling to room temperature a clear, transparent, substantially colorless, thermoplastic product resulted. When all of the resulting material is dissolved at room temperature in a volatile solvent mixture comprised of about 65 parts by weight of 95% (by volume) ethanol, about 20 parts by weight of glacial acetic acid, and about 15 parts by weight of water, the resultant composition exhibited excellent properties as a quick-drying adhesive. In place of the 75 parts of gliadin a similar glue may be made by substituting 75 parts of hordein.

Example 10

To 5 parts of zein by weight there was added 95 parts of 2-ethyl octanoic acid. After the zein dissolved in the plasticizer the mixture was applied to rayon yarns as a size which provided such yarns with a certain amount of stiffening and served as an adhesive to hold such yarns together and further to lubricate the yarns during spinning operations.

Example 11

By weight 45 parts of 2-ethyl octanoic acid, 10 parts of carbon black, and 20 parts of whiting, were mixed together and thoroughly ground on a roller mill. With the resultant mixture were incorporated by weight at room temperature, 55 parts of zein acetate and about 150 parts of a solvent mixture comprised of about 45 parts by weight of methyl Cellosolve and about 105 parts by weight of isopropyl alcohol. The resultant homogeneous product was knife-coated onto a woven fabric base. The impregnated fabric was then baked at a temperature within the general range 170° to 180° F., for a period of about 2 hours. The resultant material was a dull black artificial leather which was eminently adapted to embossing operations.

Example 12

Twenty grams of zein were dissolved in 50 ml. of 95% (by volume) ethyl alcohol and 18 ml. of commercial aqueous formalin (40% by volume), and the solution was treated in an autoclave at 15 lbs. steam pressure or 121° C., for 1 hour. To the solution of prolamine reaction product thus produced there was then added 20 grams of 2-ethyl hexanoic acid. Upon coating the lacquer thus produced upon tinplate flexible clear coatings were secured, which if further heated for 3 hours at a temperature above 130° C., became quite water-resistant as well as grease-resistant and highly flexible.

Example 13

To 7 parts by weight of a 63 percent solids solution of the sodium salts of the sulfonated fatty acid and rosin mixture, such as is secured as a byproduct in sulfate paper pulp digestion and sold as sulfonated Indusol, West Virginia Paper and Pulp Company, of New York city, New York, there was added 74 parts by weight of water, 1 part by weight of borax, 2 parts by weight of urea and 7 parts by weight of 2-ethyl hexanoic acid. There was then introduced into this solution 15 parts by weight of a de-starched, de-oiled corn gluten analyzing 73 percent protein content and 1 part by weight of lamp black and the whole slowly heated with continuous agitation to a temperature of about 165° F. After being maintained at a temperature in the general range 160° to 170° F., for about 2 hours, the mixture had become a smooth paste. This was roller-coated onto a piece of cotton cloth of 80 x 80 threads per inch square. After drying, a stiffened fabric, exhibiting a black finish, resulted. This prepared material was eminently suited for use as a window shade cloth having appropriate stiffness and flexibility for such use, and it evidenced only very slight tendencies to crack upon aging after numerous flexings. The mixture may also be employed as an interior wall paint preferably after adding per one part by weight thereof 0.5 part by weight of water.

Example 14

A zein dispersion in water with ammonium rosinate was prepared according to the method of Drewsen and Little (U. S. Patent No. 2,247,531) as follows: First, a paste of zein and aqueous ammonia was prepared in a mechanical mixer by incorporating therein by weight 4 parts of zein, 6 parts of water and 1 part of aqua ammonia (26° Be.). Then a stiff homogeneous mixture of ammonium rosinate was prepared by thoroughly mixing for several hours at an elevated temperature not in excess of 200° F., 4 parts by weight (dry basis) of papermaker's rosin and about 1 part by weight of aqua ammonia (26° Be.). The prepared zein paste and ammonium rosinate were then thoroughly mixed, resulting in a zein rosinate composition. There was then added to the mix thus prepared 2 parts by weight of 2-ethyl hexanoic acid to act as a plasticizer. This fatty acid was readily emulsified into the mix. This mix was then employed to clay coat paper by first mixing it with a clay dispersion. A suitable clay dispersion was prepared by slurrying together by weight 400 parts of kaolin, 200 parts of water and 5.5 parts of sodium pyrophosphate. To 3 parts by weight of the clay slurry there was then added 1 part by weight of the plasticized zein dispersion, and the resulting coating product was screened. This material exhibited excellent qualities as a paper coater and gave a clay-coated paper of satisfactory adhesion and wax-pick test.

The foregoing description and examples will point out that the invention is subject to numerous embodiments not herein illustrated, but falling within the scope of the appended claims.

I claim:

1. A plasticized "prolamine-base" composition of matter comprising alkyl branched-chain organic fatty acid in which the total number of carbon atoms in the molecule is in the range from 4 to 18 inclusive, and "prolamine-base" protein.

2. A plasticized prolamine composition of matter comprising alkyl branched-chain organic fatty acid in which the total number of carbon atoms in the molecule is in the range from 4 to 18 inclusive, and zein.

3. A plasticized prolamine composition of matter comprising alkyl branched-chain organic fatty acid in which the total number of carbon atoms in the molecule is in the range from 4 to 18 inclusive, and gliadin.

4. A plasticized prolamine composition of matter comprising alkyl branched-chain organic fatty acid in which the total number of carbon atoms in the molecule is in the range from 4 to 18 inclusive, and hordein.

5. A plasticized prolamine composition of matter comprising alkyl branched-chain organic fatty acid in which the total number of carbon atoms in the molecule is in the range from 4 to 18 inclusive, and prolamine-containing cereal gluten.

6. A plasticized "prolamine-base" composition of matter comprising alkyl branched-chain organic fatty acid in which the total number of carbon atoms in the molecule is in the range from 4 to 18 inclusive, and zein-base protein.

7. A plasticized prolamine composition of matter consisting of prolamine and alkyl branched-chain organic fatty acid plasticizer therefor, in which the total number of carbon atoms in the fatty acid molecule is in the range from 4 to 18 inclusive.

8. A plasticized prolamine composition of matter consisting substantially of zein and alkyl branched-chain organic fatty acid plasticizer therefor, in which the total number of carbon atoms in the fatty acid molecule is in the range from 4 to 18 inclusive.

9. A plasticized prolamine composition of matter consisting substantially of gliadin and alkyl branched-chain organic fatty acid plasticizer therefor, in which the total number of carbon atoms in the fatty acid molecule is in the range from 4 to 18 inclusive.

10. A plasticized prolamine composition of matter consisting substantially of hordein and alkyl branched-chain organic fatty acid plasticizer therefor, in which the total number of carbon atoms in the fatty acid molecule is in the range from 4 to 18 inclusive.

11. A plasticized prolamine composition of matter consisting substantially of prolamine-containing cereal gluten and alkyl branched-chain organic fatty acid plasticizer therefor, in which the total number of carbon atoms in the fatty acid molecule is in the range from 4 to 18 inclusive.

12. A plasticized "prolamine-base" composition of matter consisting substantially of "prolamine-base" protein and alkyl branched-chain organic fatty acid plasticizer therefor, in which the total number of carbon atoms in the fatty acid molecule is in the range from 4 to 18 inclusive.

13. A composition comprising by weight at least 5 parts of "prolamine-base" protein and from 5 to 95 parts of alkyl branched-chain organic fatty acid in which the total number of carbon atoms in the molecule is in the range from 4 to 18 inclusive.

14. A composition comprising by weight at least 5 parts of "prolamine-base" protein derived from corn and from 5 to 95 parts of alkyl branched-chain organic fatty acid in which the total number of carbon atoms in the molecule is in the range from 4 to 18 inclusive.

15. A coating composition comprising in solution form, "prolamine-base" protein, alkyl branched-chain organic fatty acid plasticizer therefor, in which the total number of carbon atoms in the molecule is in the range from 4 to 18 inclusive, and a mutual solvent for said materials.

16. A coating composition comprising in solution form "prolamine-base" protein, alkyl branched-chain fatty acid plasticizer therefor in which the total number of carbon atoms in the fatty acid is in the range from 4 to 18 inclusive, and a mutual solvent for said materials, there being by weight at least 5 parts of the said protein and from 5 to 95 parts of said plasticizer.

17. A coating composition comprising in solution form "zein-base" protein, alkyl branched-chain fatty acid plasticizer therefor in which the total number of carbon atoms in the fatty acid is in the range from 4 to 18 inclusive, and a mutual solvent for said materials, there being by weight at least 5 parts of the said protein and from 5 to 95 parts of said plasticizer.

18. A coating composition comprising in solution form zein, alkyl branched-chain fatty acid plasticizer therefor in which the total number of carbon atoms in the fatty acid is in the range from 4 to 18 inclusive, and a mutual solvent for said materials, there being by weight at least 5 parts of the said zein and from 5 to 95 parts of said plasticizer.

WILLARD L. MORGAN.